(12) United States Patent
Abernethy et al.

(10) Patent No.: US 9,514,442 B2
(45) Date of Patent: Dec. 6, 2016

(54) INTERLACING RESPONSES WITHIN AN INSTANT MESSAGING SYSTEM

(75) Inventors: Michael N. Abernethy, Pflugerville, TX (US); Travis M. Grigsby, Austin, TX (US); Frank L. Jania, Chapel Hill, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1462 days.

(21) Appl. No.: 12/117,762

(22) Filed: May 9, 2008

(65) Prior Publication Data
US 2009/0282347 A1 Nov. 12, 2009

(51) Int. Cl.
  G06F 3/0484 (2013.01)
  G06F 15/16 (2006.01)
  G06Q 10/10 (2012.01)
  G06F 3/023 (2006.01)

(52) U.S. Cl.
  CPC ........... *G06Q 10/107* (2013.01); *G06F 3/0237* (2013.01)

(58) Field of Classification Search
  CPC ....... H04L 51/04; H04L 51/10; H04L 67/22; H04L 12/581; H04L 12/58; H04L 12/5885
  USPC .................................................. 715/753–760
  See application file for complete search history.

(56) References Cited

U.S. PATENT DOCUMENTS

| | | | |
|---|---|---|---|
| 5,426,426 A * | 6/1995 | Hymel | 340/7.41 |
| 6,216,008 B1 * | 4/2001 | Lee | 455/466 |
| 6,539,421 B1 | 3/2003 | Appelman et al. | |
| 6,590,887 B1 * | 7/2003 | Lee | 370/342 |
| 6,658,409 B1 * | 12/2003 | Nomura et al. | 345/156 |
| 6,681,245 B1 * | 1/2004 | Sasagawa | 709/206 |
| 7,127,685 B2 | 10/2006 | Canfield et al. | |
| 7,181,497 B1 | 2/2007 | Appelman et al. | |
| 7,765,265 B1 * | 7/2010 | Granito et al. | 709/206 |
| 2005/0055416 A1 * | 3/2005 | Heikes et al. | 709/207 |
| 2005/0210394 A1 * | 9/2005 | Crandall et al. | 715/752 |
| 2005/0266837 A1 * | 12/2005 | Lim | 455/418 |
| 2006/0155785 A1 * | 7/2006 | Berry et al. | 707/204 |
| 2006/0161851 A1 * | 7/2006 | Chen et al. | 715/751 |
| 2007/0106948 A1 * | 5/2007 | Ala-Rantala | 715/752 |
| 2007/0130277 A1 * | 6/2007 | Roskind et al. | 709/207 |
| 2007/0156910 A1 * | 7/2007 | Christie et al. | 709/227 |
| 2007/0180040 A1 * | 8/2007 | Etgen et al. | 709/207 |
| 2007/0198646 A1 * | 8/2007 | Chen et al. | 709/207 |
| 2007/0203985 A1 | 8/2007 | Abernethy, Jr. et al. | |
| 2007/0233801 A1 * | 10/2007 | Eren et al. | 709/207 |
| 2007/0271340 A1 * | 11/2007 | Goodman et al. | 709/206 |
| 2008/0256190 A1 * | 10/2008 | Ryan et al. | 709/206 |
| 2008/0263157 A1 * | 10/2008 | Bhogal et al. | 709/206 |
| 2008/0320086 A1 * | 12/2008 | Callanan et al. | 709/206 |
| 2009/0026256 A1 * | 1/2009 | Kameda | 235/379 |
| 2009/0043848 A1 * | 2/2009 | Kordun | 709/205 |
| 2009/0094343 A1 * | 4/2009 | Mehrotra et al. | 709/207 |

* cited by examiner

*Primary Examiner* — Tadeese Hailu
(74) *Attorney, Agent, or Firm* — Cuenot, Forsythe & Kim, LLC

(57) ABSTRACT

A computer-implemented method of interlacing responses within an instant messaging (IM) system can include, responsive to a request from a user in an IM session, storing an IM message fragment input by the user and associating the IM message fragment with a message selected from an IM session transcript. The method can include recalling the IM message fragment and outputting, at least in part, the IM message fragment in response to the message.

20 Claims, 4 Drawing Sheets

INTERLACING RESPONSES WITHIN AN INSTANT MESSAGING SYSTEM

FIELD OF THE INVENTION

The embodiments of the present invention relate to instant messaging (IM) and, more particularly, to interlacing responses within an IM system.

BACKGROUND OF THE INVENTION

Instant messaging (IM) provides real time communication and information exchange between two or more IM clients over a communication network. The ability of IM to deliver real time communications via personal computers and workstations commonly used for work and entertainment has led to the popularity of IM as a collaborative application within many organizations and online communities.

An IM system typically includes a plurality of IM client applications (IM clients) and an IM server. Each IM client executes within a data processing system and allows a user to log into the IM system by establishing a presence for a user on the IM server. The IM server distributes IM messages between the various IM clients.

The IM client itself typically provides a graphical user interface (GUI) that includes an input window and a transcript window. User input such as text, files, graphics, audio, and the like can be entered into the input window. Messages that have been exchanged with one or more other IM clients during the course of an IM session are displayed chronologically within the transcript window. As the transcript of the IM session grows, the transcript window usually becomes scrollable, allowing users to navigate the history of the IM session.

Due to the popularity of IM, users may find themselves inundated with messages. Whether received from a plurality of different participants or a single participant in the IM session, a recipient may be in the situation where messages arrive so quickly that little or no time exists for sending a response to one message before the arrival of a next message. In these situations, the recipient often begins a response to one message, e.g., a first message, only to receive a subsequent, or second, message. If the second message is of greater importance, the user may decide to discontinue a response to the first message in favor of responding to the second message. The user typically deletes any entered, but unsent, text in response to the first message from the input window and creates a response to the second message. The unfinished response to the first message is lost.

When the user has time to respond to the first message, the user must begin the response anew. After being sent, the response will show up in the transcript window with other sent message in chronological order according to the time the message was sent. As such, the response will appear to be unrelated to the message the response was directed. This problem is exacerbated as the number of messages to which the recipient has not responded begins to increase during the IM session.

BRIEF SUMMARY OF THE INVENTION

The embodiments relate to interlacing responses within an instant messaging (IM) system. Once embodiment of the present invention can include a computer-implemented method of interlacing responses within an IM system. The computer-implemented method can include, responsive to a request from a user in an IM session, storing an IM message fragment input by the user and associating the IM message fragment with a message selected from an IM session transcript. The computer-implemented method also can include recalling the IM message fragment and outputting, at least in part, the IM message fragment in response to the message.

Another embodiment of the present invention can include a computer-implemented method of conducting an IM session using an IM client. The computer-implemented method can include, responsive to a user input during the IM session, automatically selecting all data within an input field of the IM client, wherein the selected data is an IM message fragment, storing the IM message fragment in a selectable list of IM message fragments, and clearing the input field. Responsive to a subsequent user input, recalling the IM message fragment from the selectable list of IM message fragments and presenting the IM message fragment within the input field. The IM message fragment can be output.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
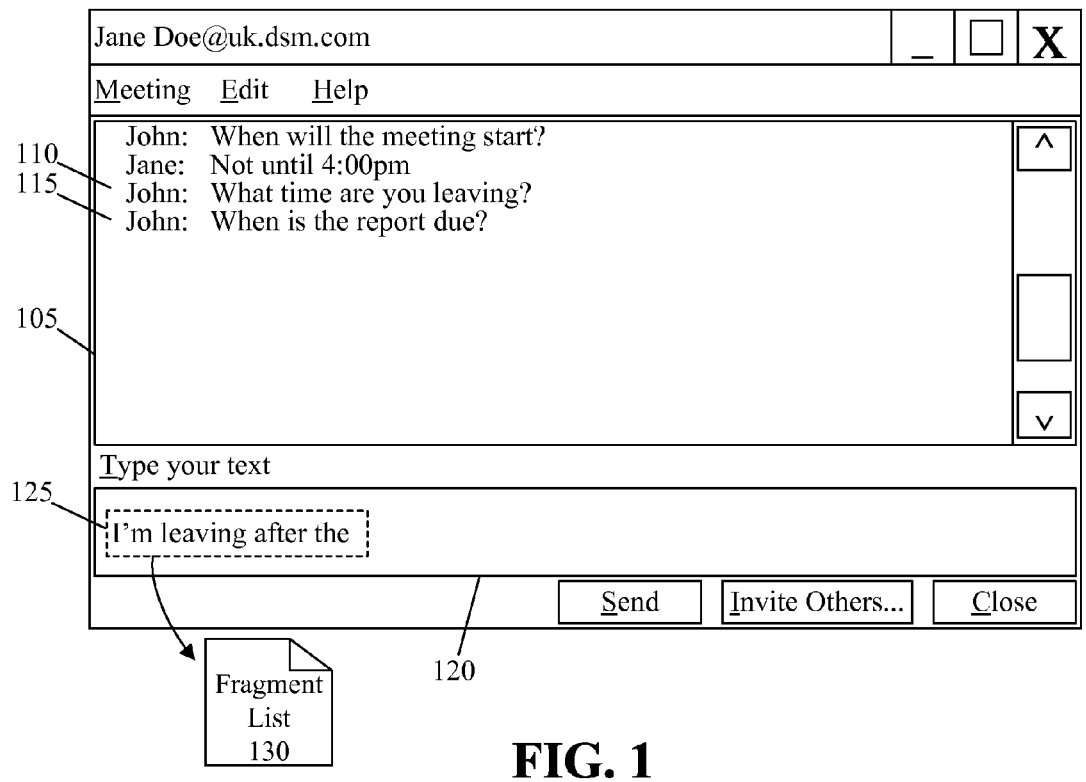
FIG. 1 is a first pictorial view illustrating a graphical user interface (GUI) of an instant messaging (IM) client in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including, but not limited to, the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In accordance with the embodiments disclosed herein, a user in an instant messaging (IM) session can begin an IM message (message) by inputting data into an input field of graphical user interface (GUI) of an IM client. The data that is input into the input field can be an IM message fragment (fragment). As used herein, an "IM message fragment," a "message fragment," or "fragment," can refer to any data entered into the input field of the IM client GUI that is not, or has not, been sent to another IM client as a message. Accordingly, a fragment can refer to any combination of letters, numbers, symbols, code, files, graphics, audio, video, etc. that is entered, listed, or otherwise specified within the input field, but not sent as a message. The term "message," as used herein, can refer to a portion of data that has been sent from one IM client to another IM client, e.g., a complete IM message.

Prior to sending the fragment in response to a first message, a recipient may receive a further, or second, message. Upon receiving the second message, the recipient may decide to answer the second message before completing the response to the first message. Accordingly, responsive to a user input, the fragment can be stored and associated with a message in the transcript window of the IM client GUI. The message that is associated with the fragment can be the message, or an estimate of the message, to which the fragment in response.

After transmitting a response to the second message, the fragment can be recalled from memory and entered into the input field. The user may then complete the fragment and send the fragment, whether modified or not, as a message.

The message can be transmitted and displayed in the transcript window with an identifier indicating the message in the transcript window with which the completed fragment, and now sent message, is associated. The identifier can provide a clearer understanding as to which message the now completed fragment is related.

FIG. 1 is a first pictorial view illustrating a GUI 100 of an IM client in accordance with one embodiment of the present invention. As shown, GUI 100 illustrates an ongoing IM session between users "John" and "Jane." A transcript window 105 can display a history or partial history of messages exchanged between the two users during the IM session.

Message 110 from John queries Jane by asking, "What time are you leaving?" Within an input field 120, Jane can begin a response to message 110. As shown, Jane begins typing a fragment 125 which says, "I'm leaving after the . . . " Prior to completing the fragment 125, Jane can receive a further message 115 querying "When is the report due?" Message 115 asks Jane about a different topic that will not be answered by a response to message 110. Jane may determine that message 115 is of greater importance than message 110 and decide to answer message 115 prior to message 110. Accordingly, Jane can issue a user input or command that causes fragment 125 to be automatically removed from input field 120 and stored in a list of fragments 130 for subsequent recall. Jane can now respond to message 115 and, when ready, recall fragment 125, complete fragment 125, and send fragment 125 as a message.

Within a conventional IM system, fragment 125 would be deleted and lost, requiring manual re-entry by Jane at a later time. If select and cut operations are performed to clear fragment 125 from input field 120, only a single fragment typically is stored at one time. For example, if Jane receives a further query and decides to respond to that latest query, a further select and cut operation will result in any prior stored fragment being overwritten. Further, conventional select and cut operations will not track association of a fragment to a particular message in the transcript window.

When Jane does respond to message 115, the response will be displayed in chronological order in a conventional IM client such that the response is displayed below the most recent sent message. The response will not appear to have any relation to message 115. The lack of association between message 115 and the response to message 115, regardless of when sent, can create confusion as to which message the response corresponds.

Figure 2:
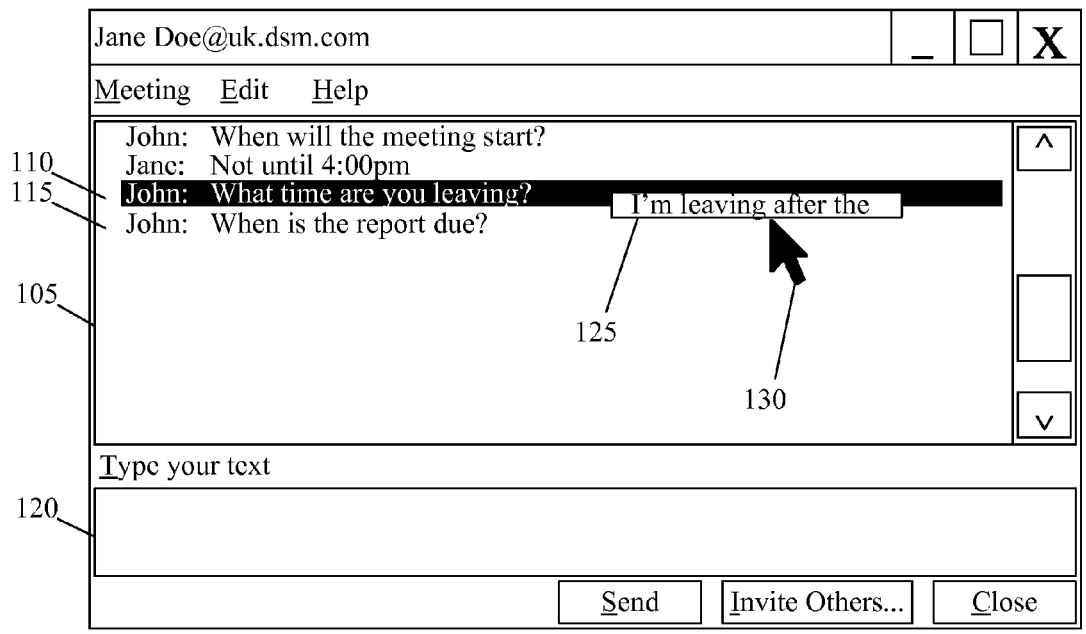
FIG. 2 is a second pictorial view illustrating the GUI of the IM client in accordance with another embodiment of the present invention.

FIG. 2 is a second pictorial view illustrating GUI 100 of the IM client in accordance with another embodiment of the present invention. FIG. 2 illustrates a continuation of the IM session described with reference to FIG. 1. Within GUI 100, the user can select fragment 125 using a pointer 130. Fragment 125 can be associated with a particular message in the transcript window 105 by dragging fragment 125 and dropping fragment 125 over the message with which fragment 125 is to be associated. In this case, fragment 125 can be dropped over, and associated with, message 110.

For example, responsive to a user placing pointer 130 within input field 120, fragment 125 can be automatically selected to facilitate the drag operation. The user can begin dragging fragment 125 from input field 120 to the target destination. Upon initiating the drag operation, fragment 125 can be removed or cleared from input field 120. As fragment 125 is moved over different messages, each message can be highlighted. Highlighting a message can indicate that the message is a drop target were fragment 125 to be released. It should be appreciated that when the transcript of the IM session is too large to fit in the transcript window, moving pointer 130 near the top or bottom of transcript window 105 while dragging fragment 125 will cause transcript window 105 to scroll up or down as the case may be. This allows any message from the transcript of the current IM session to be selected, whether currently viewable in transcript window 105 or not.

Fragment 125 can be dropped on highlighted message 110. Responsive to the drop operation, fragment 125 can be stored in a fragment list. Additionally, an association between message 110 and fragment 125 can be created. Fragment 125, or the entry within the fragment list that corresponds to fragment 125, can be time stamped with time and/or date information indicating the time and/or date that fragment 125 was added to the fragment list, e.g., stored. It should be appreciated that any messages, e.g., messages 110 and 115, within the transcript window 105 will have time stamps as well.

In another embodiment, a user input such as a command, whether a combination of keystrokes or a single keystroke, can be received. Responsive to such a user input or command, fragment 125 can be automatically removed from input field 120 and stored in the fragment list. The fragment list can be presented to the user as a drop down menu, as a list with check boxes, or the like. Upon storing fragment 125, the transcript window 105 can automatically refocus to, or highlight, a message having a timestamp that is closest in time to the time stamp of fragment 125. In one embodiment, the message having a time stamp that is closest in time and before the time stamp of fragment 125 can be selected. The selected message can be a default suggested message to which fragment 125 can be associated. The user may, however, select other messages, for example, using the arrow keys to navigate messages in the transcript window 105 up and down to select the desired message with which to associate fragment 125.

For example, with input field 120 active, the user can simultaneously strike the keys "control" and "up arrow." This user input can cause the IM client to automatically remove fragment 125 from input field 120, store fragment 125, and time stamp fragment 125. Message 115, as a result of having the closest time stamp to the storage time of fragment 125, can be highlighted. Using the up arrow key, the user can navigate up to message 110, the message to which fragment 125 should be associated, and press the enter key to associate message 110 with fragment 125. In this way, fragment 125 can be stored for re-use, along with information identifying message 110 as the message to which fragment 125 was responding.

Figure 3:
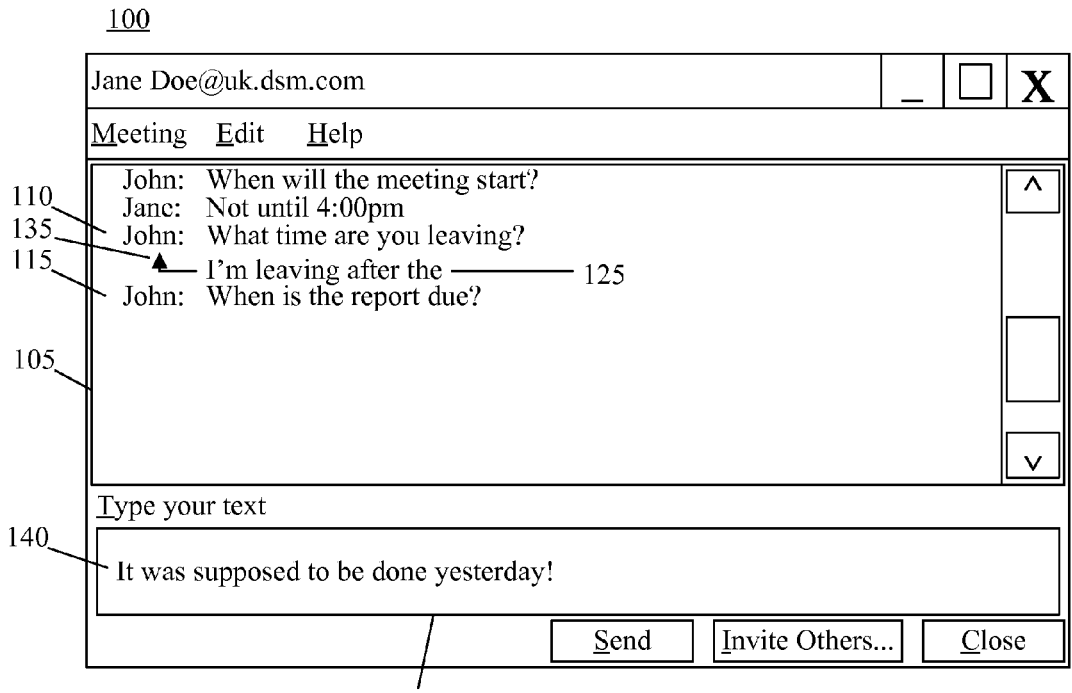
FIG. 3 is a third pictorial view illustrating the GUI of the IM client in accordance with another embodiment of the present invention.

FIG. 3 is a third pictorial view illustrating the GUI 100 of the IM client in accordance with another embodiment of the present invention. FIG. 3 can represent a continuation of the IM session described herein. Once fragment 125 has been stored and associated with message 110, transcript window 105 can graphically display an indicator 135 representing the association between message 110 and fragment 125. Having stored fragment 125, the user now can enter a message 140 in the input field 120 in response to message 115. Fragment 125 has been stored, associated with a particular message, and can be recalled at a later time.

In one embodiment, indicator 135 can be viewable only within the IM client of the user that wrote fragment 125, in this case GUI 100 for user Jane. Any other participants in the IM session will not be aware of fragment 125 until such time that fragment 125 is completed and sent as a message. Indicator 135 gives the user a visual indication of the message with which fragment 125 has been associated. In addition, indicator 135 can serve as a reminder that message 110 still requires a response.

It should be appreciated that while indicator 135 is shown as an arrow, any of a variety of different visual indicators can be used to show an association between a fragment and a message. For example, both message 110 and fragment 125 can be simultaneously highlighted. In another example, fragment 125 can be displayed adjacent to, or next to, message 110. In still another example, special coloring or highlighting can be used to indicate that message 110 requires a response and has been associated with a fragment.

Figure 4:
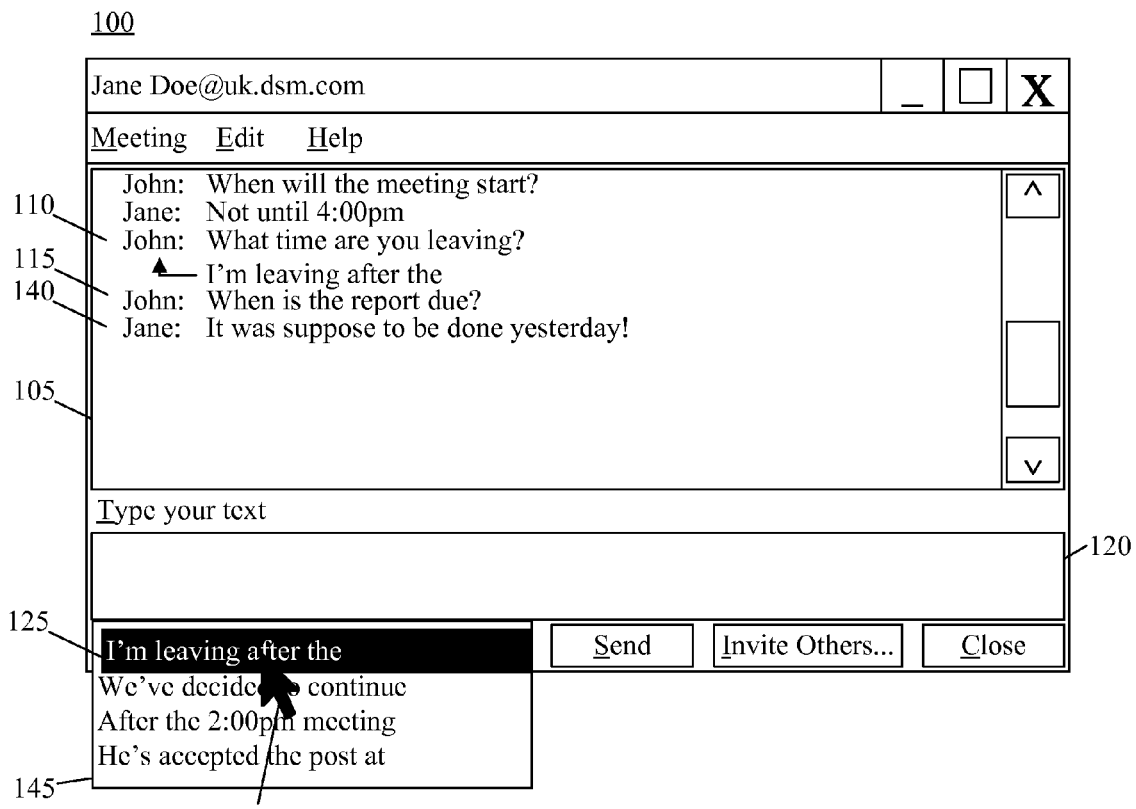
FIG. 4 is a fourth pictorial view illustrating the GUI of the IM client in accordance with another embodiment of the present invention.

FIG. 4 is a fourth pictorial view illustrating GUI 100 of the IM client in accordance with another embodiment of the present invention. FIG. 4 illustrates a continuation of the IM session described herein. In GUI 100, message 140 has been transmitted in response to message 115 and, thus, is displayed in transcript window 105. Having completed message 140, the user can decide to revisit responding to message 110. Fragment 125 can be recalled from a selectable list of stored fragments and placed into input field 120.

In the example illustrated in FIG. 4, fragment 125 has been selected using pointer 130 from a drop down type list 145. As shown, the drop down list 145 can drop down from the input field 120. Drop down list 145 can include one or more fragments that have been stored as described herein, allowing the subsequent recall of one or more of those fragments individually. It should be appreciated that when a fragment is recalled into input field 120, that fragment can be removed from the fragment list. Each fragment in drop down list 145 can be associated with a message in the transcript window 105. Although embodied as a drop down list, any other graphical means of presenting the list of fragments can be used.

Pointing device 130 can select fragment 125 from drop down list 145. Responsive to selection of fragment 125, fragment 125 can be automatically populated into input field 120. It should be appreciated that keyboard input can be used to traverse drop down list 145 as well. For example, the arrow keys and the enter key can be used navigate to a desired fragment and select that fragment. In this manner, fragment 125 can be recalled by the user, completed, and sent in response to message 110.

Figure 5:
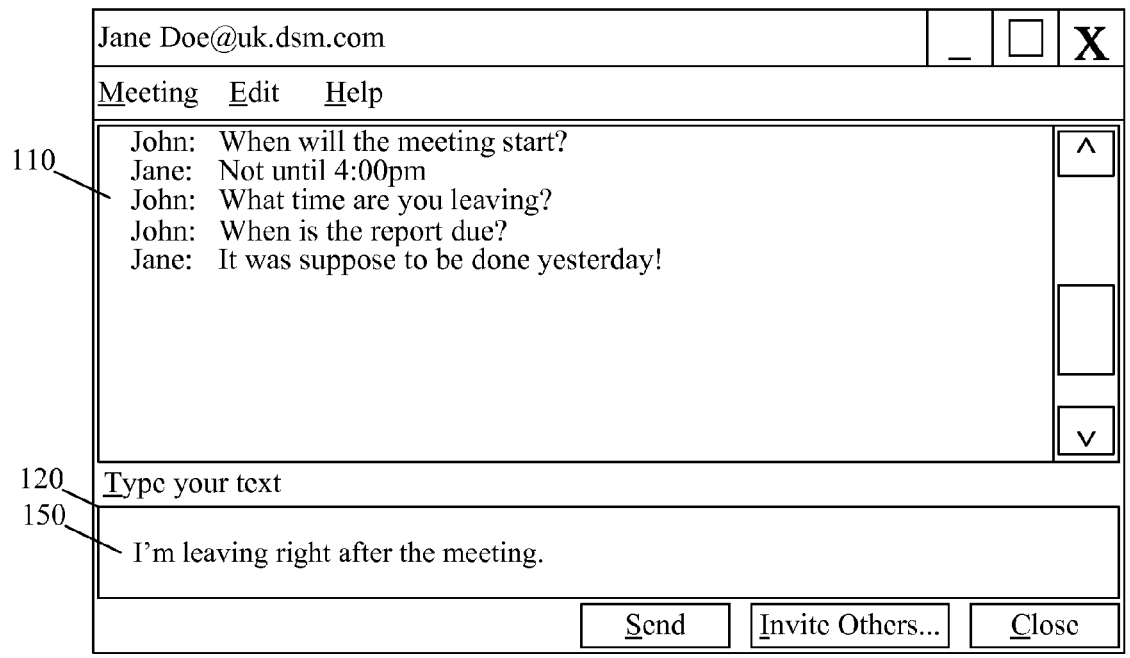
FIG. 5 is a fifth pictorial view illustrating the GUI of the IM client in accordance with another embodiment of the present invention.

FIG. 5 is a fifth pictorial view illustrating GUI 100 of the IM client in accordance with another embodiment of the present invention. FIG. 5 also represents the continuation of the IM session described herein. In GUI 100, fragment 125 can be recalled and populated into input field 120. Once recalled, the user can edit fragment 125 or add text to formulate a complete response. In this example, fragment 125, which is "I'm leaving right after the" can be recalled. Text can be added in input field 120 such that fragment 125 reads "I'm leaving right after the meeting." Once a complete response is created, or the user has finished editing fragment 125, the user can select the "send" button. Selection or activation of the "send" button causes fragment 125 to be sent to a recipient as a completed response, referred to as message 150.

Figure 6:
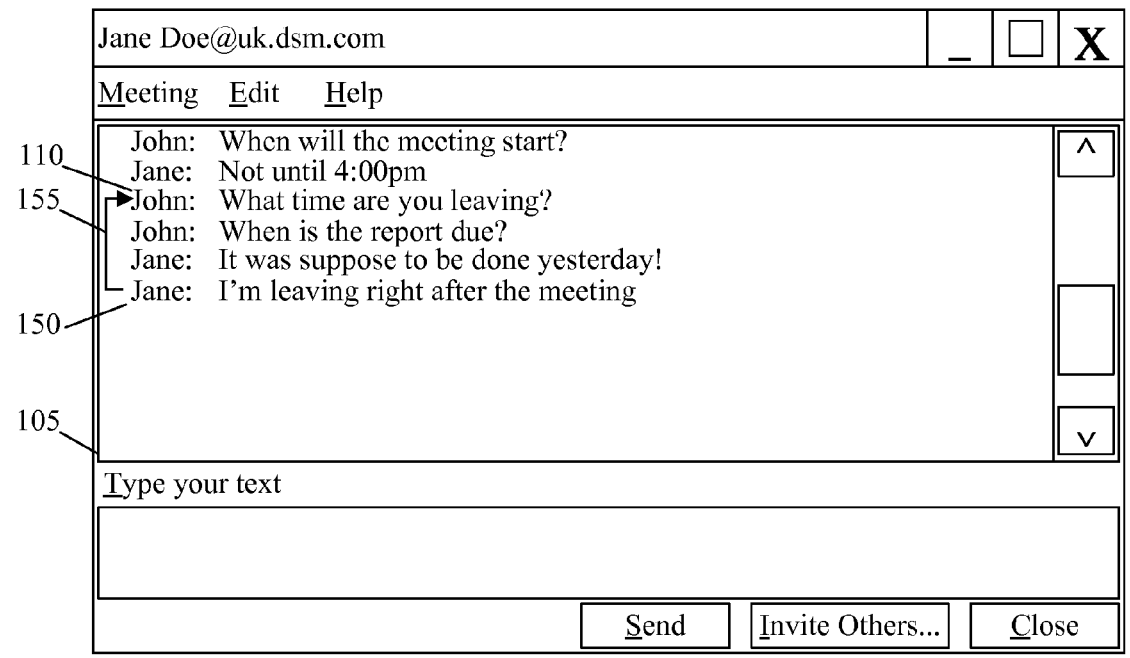
FIG. 6 is a sixth pictorial view illustrating the GUI of the IM client in accordance with another embodiment of the present invention.

FIG. 6 is a sixth pictorial view illustrating GUI 100 of the IM client in accordance with another embodiment of the present invention. FIG. 6 illustrates the continued IM session discussed herein. After sending message 150, message 150 can be displayed within transcript window 105. In addition, an indicator 155 can be displayed which clearly indicates the association between message 150 and message 110. Indicator 155, in this case a directional indicator, indicates that message 150 is a response to message 110. In this way, the conversation flow of transcript window 105 is clarified, as each time a message is created from a text fragment as described herein, the resulting message can be graphically associated with the message to which the completed message (built from fragment 125), was responding.

Indicator 155, or some programmatic construct representative of the association, can be output and sent along with the message 150. A receiving IM client, if so configured, can interpret the associative data and present indicator 155 as is shown in the sending IM client in FIG. 5. It should be appreciated that in cases where such functionality is not supported, the extraneous information specifying indicator 155 and association information between messages 150 and 110 can be ignored by the IM client that receives such information.

In one embodiment, the association of a fragment to a message may occur when the fragment is stored. In another embodiment, however, the association can be created after the fragment is recalled. For example, a text fragment can be recalled, used as the basis for a completed response, and the completed response sent using a drag and drop operation. The drag and drop operation can involve selecting the completed response with a pointing device, dragging the completed response over a message in transcript window 105, and releasing the completed response over a selected message in transcript window 105, thereby creating an association between the dragged message and the target message over which the dragged message was dropped. After dropping the completed message, the message can be transmitted. The association can be represented as discussed or shown using another suitable means of visually illustrating an association between two messages, e.g., indentation of related messages, use of a symbol preceding each related message, the same coloring, etc.

Figure 7:
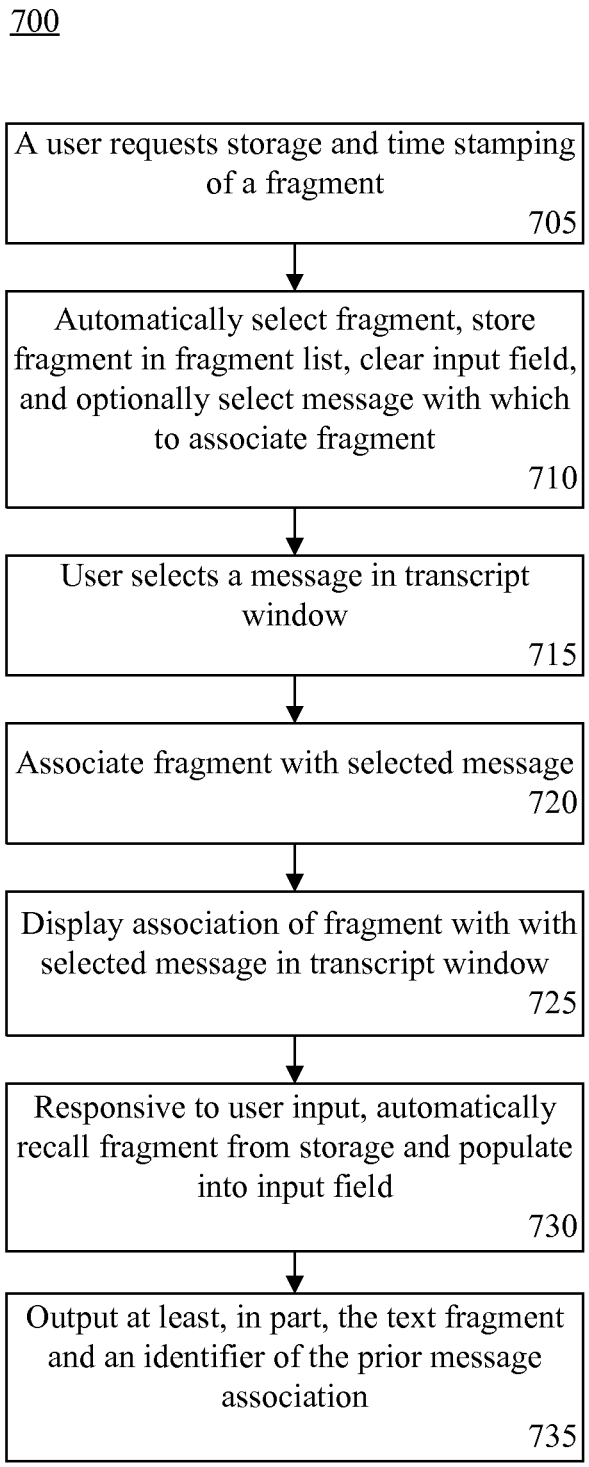
FIG. 7 is a flow chart illustrating a method of interlacing responses within an IM system in accordance with another embodiment of the present invention.

FIG. 7 is a flow chart illustrating a method 700 of managing fragments and/or interlacing responses in accordance with another embodiment of the present invention. Method 700 can facilitate the storage of fragments and provide a conversational context between messages. This conversational context can illustrate query-response relationships among messages in the transcript window of the IM client. As noted, the query-response relationships may not correspond or be apparent from a conventional view of an IM transcript where messages are ordered chronologically according to time sent and/or received.

Method 700 can begin in a state where a user has entered a fragment into an input field of a GUI of an IM client configured as discussed herein with reference to FIGS. 1-6. Prior to sending the fragment as a message, the user may receive a further message, e.g., a query or question, within the IM client. The user can decide to discontinue writing the fragment, e.g., the first response, and instead begin writing a response to the subsequently received message.

In step 705 the user can provide an input that requests storage of the fragment currently within the input field. In step 710, the fragment can be automatically selected, automatically stored within the fragment list, and automatically cleared from the input field.

Optionally, a particular message can be selected from the transcript window, whether viewable or not, as an estimate of the message to which the fragment will be associated. As noted, the selection of a particular message can be performed through time stamp information by selecting a message having a time stamp that is closest in time to the moment when the command to store the fragment was received. The transcript window can be refocused so that the selected message and surrounding portions of the transcript of the IM session are viewable within the transcript window.

In step 715, the user can select a message in the transcript of the current IM session. As noted, the user can navigate to the desired message within, or through, the transcript window. The selected message will be associated with the fragment. It should be appreciated that if the message selected in step 710 is the correct message, the user need not navigate to another message, but rather select the estimated message which, for example, can be highlighted. In step 720, the fragment can be associated with the selected message.

In step 725, the association between the fragment and the selected message can be visually illustrated in the transcript window of the user that created the fragment. In one embodiment, the content of the selected message can be displayed next to the fragment in a drop down list. For example, the each line of the drop down list can include a fragment and the message associated with that fragment in the following format: <fragment>|<message> or <message>|<fragment>. It should be appreciated that in cases where the fragment and/or message is long, a portion of the fragment and/or the message can be used in lieu of the entire message and/or fragment.

Subsequently, for example, after responding to one or more other messages, the user can return to responding to the selected message. In step 730, responsive to a user input, the fragment can be automatically recalled from storage and automatically populated into the input field. As noted, the fragment can be recalled from a drop down list or selected from another type of list or GUI. Once recalled, the user may or may not edit the fragment in order to structure a complete response to the selected message that is associated with the fragment.

In step 735, the fragment and an identifier specifying the association between the fragment and the selected message can be output, e.g., sent to another IM client or the IM server. As used herein, "output" or "outputting" can include, but is not limited to, writing to a file, writing to a user display or other output device, playing audible notifications, sending or transmitting to another system, exporting, or the like. Once sent, the now complete fragment (response) can be shown in the transcript window of the sender and the recipient. An identifier can be displayed which links the response to the associated message.

In another embodiment, the response can be displayed or inserted into the transcript window at a line that is immediately below the message with which the response is associated. As noted, the response and associated message also can be indicated by coloring the response and associated message in a same color that is different from other messages, placing an index or icon to the left or right edge of the response and associated message, or the like. Further, any combination of mechanisms for visualizing the association between the response and the associated message can be used.

In still another embodiment, the indicator can be text that informs the recipient of the particular message with which the response is associated. For example, the completed fragment "I'm leaving at 5:00" from Jane can be associated with the message "What time are you leaving?" from John. When the completed fragment, e.g., the response, is sent, the indicator can be text that is pre-pended to the response. Within the transcript window of John's IM client, the following message can be displayed: "In response to 'What time are you leaving,' Jane says: I'm leaving at 5:00." This embodiment allows an IM client that does not support graphical means of illustrating message associations to visually indicate an association between a response and a message using text.

The various exemplary GUIs used herein have been provided for purposes of illustration only. Those skilled in the art will recognize that other GUIs, controls, selection mechanisms, navigation mechanisms, and the like can be used without departing from the spirit of the invention.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method within an instant messaging (IM) system, comprising:

storing, responsive to a request from a user within an IM session, an IM message fragment;

receiving, from the user, a selection of one of a plurality of messages within an IM session transcript;

generating an association between the stored IM message fragment and the selected one of the plurality of messages;

recalling, responsive to a user input, the stored IM message fragment; and presenting the recalled IM message fragment within an input field of the IM session, wherein the IM message fragment has not been transmitted from the user to an intended recipient of the IM message fragment, and the IM session transcript includes messages from both the user and the intended recipient.

2. The method of claim 1, wherein
the IM message fragment is stored within a list of IM message fragments.

3. The method of claim 2, wherein
the list of IM message fragments is presented to the user responsive to the user input.

4. The method of claim 2, wherein
the recalled IM message fragment is selected, by the user, from the list of IM message fragments.

5. The method of claim 1, further comprising
outputting the IM message fragment, as a completed message, and the association.

6. The method of claim 5, wherein
an identifier specifies the association, and
the IM message fragment and the identifier are sent to an IM server connecting the user to the intended recipient or an IM client of the intended recipient.

7. The method of claim 5, wherein
the completed message is displayed within an IM transcript window, of an IM client of the user, that displays the IM transcript.

8. The method of claim 1, wherein
the IM message fragment is all data within the input field upon receiving the request.

9. The method of claim 1, further comprising
visually displaying the association between the IM message fragment and the selected one of the plurality of messages.

10. The method of claim 1, further comprising
visually distinguishing, upon the IM message fragment being dragged over the selected one of the plurality of messages, the selected one of the plurality of messages from other messages in an IM transcript window, of an IM client of the user, that displays the IM transcript.

11. A computer program product, comprising:
a computer-usable storage device having stored therein computer-usable program code
the computer-usable program code, which when executed on a computer hardware system including an instant messaging (IM) system, causes the computer hardware system to perform:
storing, responsive to a request from a user within an IM session, an IM message fragment;
receiving, from the user, a selection of one of a plurality of messages within an IM session transcript;
generating an association between the stored IM message fragment and the selected one of the plurality of messages;
recalling, responsive to a user input, the stored IM message fragment; and
presenting the recalled IM message fragment within an input field of the IM session, wherein
the IM message fragment has not been transmitted from the user to an intended recipient of the IM message fragment,
the IM session transcript includes messages from both the user and the intended recipient, and
the computer-usable storage device does not consist of a transitory, propagating signal.

12. The computer program product of claim 11, wherein
the IM message fragment is stored within a list of IM message fragments.

13. The computer program product of claim 12, wherein
the list of IM message fragments is presented to the user responsive to the user input.

14. The computer program product of claim 12, wherein
the recalled IM message fragment is selected, by the user, from the list of IM message fragments.

15. The computer program product of claim 11, wherein
the computer-usable program code further causes the computer hardware system to perform
outputting the IM message fragment, as a completed message, and the association.

16. The computer program product of claim 15, wherein
an identifier specifies the association, and
the IM message fragment and the identifier are sent to an IM server connecting the user to the intended recipient or an IM client of the intended recipient.

17. The computer program product of claim 15, wherein
the completed message is displayed within an IM transcript window, of an IM client of the user, that displays the IM transcript.

18. The computer program product of claim 11, wherein
the IM message fragment is all data within the input field upon receiving the request.

19. The computer program product of claim 11, wherein
the computer-usable program code further causes the computer hardware system to perform
visually displaying the association between the IM message fragment and the selected one of the plurality of messages.

20. The computer program product of claim 11, wherein
the computer-usable program code further causes the computer hardware system to perform
visually distinguishing, upon the IM message fragment being dragged over the selected one of the plurality of messages, the selected one of the plurality of messages from other messages in an IM transcript window, of an IM client of the user, that displays the IM transcript.

* * * * *